United States Patent [19]

Hoshino et al.

[11] 4,431,461

[45] Feb. 14, 1984

[54] METHOD FOR PRODUCING AL-BASE ALLOY SUBSTRATES FOR MAGNETIC RECORDING MEDIA

[75] Inventors: Kohzoh Hoshino; Muneo Mizuno; Hiroshi Murakado; Yoshinobu Kitao, all of Mooka, Japan

[73] Assignee: Kabushiki Kaisha Kobe Seiko Sho, Kobe, Japan

[21] Appl. No.: 229,141

[22] Filed: Jan. 28, 1981

[30] Foreign Application Priority Data

Jan. 28, 1980 [JP] Japan .................................. 55-9107

[51] Int. Cl.³ ................................................ C22F 1/04
[52] U.S. Cl. ................................. 148/2; 148/11.5 A; 148/31.5
[58] Field of Search ................ 148/2, 11.5 A, 32, 31.5

[56] References Cited

U.S. PATENT DOCUMENTS 3,359,085 12/1967 Anderson ...................... 148/11.5 A
4,235,646 11/1980 Neufeld et al. ........................ 148/2
4,284,437 8/1981 Baba et al. ..................... 148/11.5 A

*Primary Examiner*—R. Dean
*Attorney, Agent, or Firm*—Oblon, Fisher, Spivak, McClelland & Maier

[57] ABSTRACT

A method for producing Al-base alloy substrates for magnetic discs, which comprises continuously casting into a strip of a thickness of 4 to 15 mm a molten alloy composition containing alloy components consisting of 2–6% of Mg, less than 1% of Mn, less than 0.3% of Fe, less than 0.25% of Zn and less than 0.35% of Cr and a grain refiner comprising less than 0.08% of Ti and/or less than 0.01% of B, followed by rolling.

7 Claims, No Drawings

METHOD FOR PRODUCING AL-BASE ALLOY SUBSTRATES FOR MAGNETIC RECORDING MEDIA

BACKGROUND OF THE INVENTION

This invention relates to a method for producing aluminum-base alloy substrates for magnetic recording media such as magnetic memory discs, and more particularly to a method for producing aluminum-base alloy substrates for magnetic discs, which have few surface defects and excellent surface uniformity after grinding or polishing.

The magnetic discs which are most widely used as a memory medium for computers are generally produced by machining a substrate of an aluminum alloy to a predetermined thickness followed by precision grinding and coating of the surface of the substrate with a thin film of a material which is magnetizable for recording signals. The magnetic disc substrate of this sort is required to meet the following conditions.

(1) The surface roughness after precision polishing should be small enough to maintain a constant flying height of the magnetic head for stable read/write characteristics.

(2) On polished substrate the surface defects which adversely affect the uniform formation of the coated film of the magnetizable material should be few and of sufficiently small dimensions.

(3) The substrate should have sufficient mechanical strength to withstand machining and grinding in the fabrication process as well as highspeed rotation while in the softened state.

(4) The substrate should have good corrosion resistance and a certain degree of heat resistance.

(5) It should be non-magnetic, light in weight and low in cost.

The magnetic disc substrates which are currently most popular in the art are made of an aluminum alloy AA 5086. However, recently there has been an increasing demand for magnetic discs having a large capacity and high density. It is necessary to obtain such high density disc that magnetic area for each bit of signal, thickness of magnetic film and flying height of the head should be reduced. Consequently, the finished surface of substrate have excellent uniformity to provide such high density disc. In this regard, the abovementioned alloy AA5086 is unsatisfactory in surface uniformity.

SUMMARY OF THE INVENTION

Under these circumstances, the present inventors conducted a study to find out the cause of the unsatisfactory surface uniformity and as a result discovered the following facts.

(a) In the metallic matrix of the substrate of the above-mentioned alloy, there exist various intermetallic compounds (e.g., of the Al-Fe-Mn and Mg-Si phases) having a size of about 10 $\mu$m in diameter of length. Because the interface of their intermetallic compounds is incoherent with the matrix and the hardness of the compound is higher than that of the matrix, their compounds tend to remain as projections or come off to form voids on the surface of the substrate when it is machine or polished. Therefore, it is difficult to reduce the size of surface defects even after an elaborate polishing operation.

(b) When a grain refiner is added in little amount at the time of direct chill casting, the ingot portion which will form a surface of the grinded substrate after rolling bears feather-structure of about 1 mm in which with micro-segregation of intermetallic compounds at their boundaries. The micro-segregation imposes an adverse effect on the recrystallizing behavior in the subsequent hot-rolling stage and the result is a macrostructure having a period as large as about 1 mm in width when the surface of the grinded substrate is etched with aqua regia. The material therefore contains variations in hardness according to the period of the macro-structure resulting from the micro-segregation in the ingot. Due to such variations in hardness, fine undulations with a period of about 1 mm appear on the surface of the disc substrate in the cutting or grinding stage (generally referred to as "trough phenomenon:, which ordinarily have a period of 0.5–2 mm and a height of about 0.1 $\mu$m), making it difficult to maintain a constant flying height of the head.

In view of these results, it is an object of this invention to improve the surface uniformity of the aluminum substrate by reducing as much as possible the size of intermetallic compound in the ingot by preventing the above-mentioned micro-segregation, with addition of a grain refiner.

A further object is to provide an alloy composition and casting conditions which permit the manufacture of aluminum discs having very uniform surfaces. It has now been found that the above-mentioned objects can be achieved by restricting the kinds and contents of additive alloy components and especially by reducing the thickness of strips produced by continuous casting. By so doing, the intermetallic compounds are refined to a considerable degree due to a rapid-cooling effect and by addition of grain refiner, the micro-segregations of the intermetallic compounds are reduced.

In summary, the present invention resides in a method for producing an aluminum-base alloy substrate for magnetic discs, comprising continuously casting into a strip of a thickness of 4 to 15 mm a molten alloy composition containing alloy components consisting essentially of 2–6% of Mg, less than 1% of Mn, less than 0.3% of Fe, less than 0.25% of Zn and less than 0.35% of Cr and a grain refiner consisting essentially of less than 0.08% of Ti and/or less than 0.01% of B, balance Al and inevitable impurities, followed by rolling of the resulting cast strip. All proportions of the ingredients are by weight.

The reasons underlying the above-defined ranges and amounts of the additive alloy elements and the conditions of the continuous casting operation are discussed more particularly in the following description along with the resulting effects. However, it is to be understood that the present invention is not limited to the particulars shown herein and includes all alterations and modifications are encompassed by the appended claims.

DETAILED DESCRIPTION OF THE INVENTION AND PREFERRED EMBODIMENTS

Of the additive alloy elements employed in the present invention, Mg is a component which is essential for imparting a predetermined mechanical strength to the substrate and therefore should be included in a proportion of at least 2% or more. However, the additive amount of Mg should be less than 6% since excessive addition of Mg will invite increased formation of an intermetallic compound of Mg-Si and the increased formation of MgO (non-metallic inclusion) which is produced by high-temperature oxidation in the melting and continuous casting stages. The surface uniformity will be lowered by thus formed: Mg-Si and MgO.

The alloy component Mn serves to enhance the corrosion resistance of the alloy plate while Fe contributes to improve the strength of the plate. Excessive addition of these elements leads to production of large inter-metallic compounds of Al-Fe-Mn phase so that Mn and Fe should be added in an amount of less than 1% and less than 0.3%, respectively.

The Cr-component, which acts to enhance the corrosion resistance of the alloy plate similarly to Mn, should be added in an amount less than 0.35% Since otherwise it will lower the surface uniformity by enlarging the inter-metallic compounds of Al-Fe-Mn phase.

The Zn-component has a tendency to lower the corrosion resistance of the ultimate product but this defect is almost unnoticeable when its content is less than 0.25%.

The Ti and B components are effective for making the ingot structure finer and for preventing the micro-segregations, and, in order to achieve these effects to a significant degree, it is preferred to add more than 0.001% of Ti and 0.0005% of B singly or jointly. However, an additive amount of Ti in excess of 0.08% and an additive amount of B in excess of 0.01% are wasteful since the excess portions are mostly filtered out in the molten metal filtering stage using an electrochemical adsorption filter.

The Al-component used in the present invention has a purity of 99% or higher, so that Cu and Si which are unabidably contained in the Al-component are only of the order of impurities and thus have no possibility of enlarging the intermetallic compounds in any practically objectionable degree.

According to the present invention, the Al-base alloy of the above-described composition is melted and the molten metal is passed through an electrochemical adsorption filter to remove non-metallic inclusions therefrom prior to the continuous casting stage in which the molten metal has to be formed into a 4 to 15 mm thick strip in order to achieve the object mentioned hereinbefore. In the ordinary direct chill casting process, it is the usual practice to form a slab of 300 to 600 mm in thickness. However, it has been found that it is difficult to solidify a slab of the usual large thickness in such a manner that the intermetallic compounds are reduced to a size smaller than 3 μm, no matter, what the alloy composition. However, if the thickness of the cast strip formed in the continuous casting stage is reduced to 15 mm or smaller, the cast strip is solidified very quickly, permitting formation of fine intermetallic compounds. For example, the intermetallic compound size in an ordinary 300–600 mm thick slab obtained by the conventional direct chill casting process is about 12 μm. On the other hand, a cast strip having a thickness of smaller than 15 mm can be solidified at a rate more than ten times greater, with the simultaneous reduction of the intermetallic compound to a size smaller than 3 μm. In addition, there occurs almost no micro-segregation owing to the formation of the fine crystal grains with the addition of grain refiner.

Therefore, the Al-base alloy plate which is obtained after hot-, warm- or cold-rolling contains very fine and uniform macro-structure, in the subsequent machining or grinding operation, it is free of surface undulations caused by enlarged macro-structure or caused by the micro-segregations of intermetallic compounds.

As will be gathered from the foregoing description, it is desirable that the cast strip formed in the continuous casting stage have as small a thickness as possible, but is preferred to have at least a thickness of 4 mm in consideration of the 50% reduction by cold-rolling which is required subsequently to ensure machining accuracy in the punching, cutting and grinding operations of the disc plate. On the other hand, if the thickness of the strip exceeds 15 mm, it becomes difficult to solidify it at a sufficiently high rate, with consequent failure to form fine intermetallic compounds.

It is to be understood that the term "continuous casting" as herein used includes semi-continuous casting.

The effects resulting from the above-described method of the present invention can be summarized as follows.

(1) The constituent elements and their proportions in the alloy are restricted, and the alloy strip is formed into as small a thickness as possible in the continuous casting operation to allow rapid solidifying of the strip, so that the size of the intermetallic compounds minimized and the intermetallic compounds are uniformly dispersed in the matrix. As a result, there can be obtained an Al-base alloy plate for magnetic discs, which has high surface uniformity and which is free of surface undulation due to the micro-segregations of the intermetallic compounds and due to the enlarged macro-stracture caused by the above-mentioned micro-regregations.

(2) Consequently, it becomes possible to reduce the thickness of the magnetic coating film and the flying height of the head in order to cope with the requirements of larger capacity and higher in formation density on magnetic discs.

(3) An alloy substrate which is comparable to or higher than the conventional counterparts in mechanical strength, heat resistance and corrosion resistances can be obtained by a simple method, so that it becomes possible to provide magnetic disc substrates of higher quality at a similar cost.

The invention is illustrated more particularly by the following Examples.

EXAMPLE 1

Molten Al-base alloys of the compositions Nos. 1 to 4 of Table 1 were passed through an ordinary electrochemical adsorption filter for the removal of non-metallic inclusions and then formed into a 5 mm thick strip by continuous casting. The grain size on the surface of the cast strip was adjusted to 0.055 mm by addition of a grain refiner (Ti and/or B). The resulting cast strip was cold-rolled into a thickness of 2 mm, and was punched to substrates followed by heat treatment (250° C. for 2 hours) to get flatness of the material.

For the purpose of comparison, molten Al-base alloy of the composition No. 5 of Table 1 was, after removing non-metallic inclusions in a similar manner, formed into a 360 mm thick slab by the ordinary direct chill casting and scalping. The slab had a feather structure. After a homogenizing heating treatment (520° C. for 6 hours), the slab was hot-rolled to a thickness of 5 mm and, after reduction to 2 mm by cold-rolling, subjected to a heat treatment (250° C. for 2 hours) to get flatness.

After cutting 0.1 mm from both sides of each sample strip according to the procedure of the ordinary disc manufacturing process, the sample was softened by re-annealing to get flatness and then finished by buffing to measure the size and number of surface defects (surface defects attributable to the intermetallic compound), surface roughness (trough phenomenon) and mechanical properties. The results are shown in Table 2.

The surface roughness was determined by buffing the surface of each sample with powder of aluminum oxide and measuring the maximum surface roughness by means of a surface roughness meter. The size and number of intermetallic compound was assessed by observing the polished surface with a scanning electron microscope at a magnification of 500, spotting the microscope on ten randomly selected rectangular areas of 1 mm² having a dimension of 0.2 mm in the rolled direction and 5 mm in the transverse direction and counting the number of intermetallic compounds in the view field with respect to four ranks, namely an intermetallic compound size, greater than 2.5 μm, an intermetallic compound size greater than 3.75 μm, an intermetallic compound size greater than 5 μm and an intermetallic compound size greater than 10 μm.

gations which would cause the through phenomenon in the subsequent polishing operation.

The respective sample strips have almost no difference in mechanical properties, since these depend mainly on the Mg-content.

EXAMPLE 2

Molten Al-base alloy compositions Nos. 6 and 7 of Table 3 were cast into a 12 mm thick strip after removal of non-metallic inclusions in the same manner as in Example 1. The grain size on the surface of the cast strip was adjusted to 0.05 mm by addition of grain refining agent (Ti). The resulting cast strips were hot-rolled to a thickness of 5 mm and with a final temperature of 330° C. and then cold-rolled to a thickness of 2 mm, were punched to the substrates, followed by a heat treatment (250° C. for 2 hours) to get flatness.

The compositions Nos. 8 and 9 were similarly formed into 20 mm thick strips by continuous casting (grain size: 0.055 mm), hot-rolled into a thickness of 5 mm with

TABLE 1

| No. | | Alloy Compositions (wt %) | | | | | | | | |
| --- | --- | --- | --- | --- | --- | --- | --- | --- | --- | --- |
| | | Si | Fe | Cu | Mn | Mg | Zn | Cr | Ti | B |
| 1 | Invention | 0.095 | 0.158 | 0.005 | 0.09 | 2.89 | 0.011 | 0.175 | 0.011 | — |
| 2 | " | 0.070 | 0.178 | 0.010 | 0.36 | 3.78 | 0.009 | 0.085 | 0.019 | — |
| 3 | " | 0.080 | 0.165 | 0.003 | 0.45 | 3.89 | 0.010 | 0.070 | — | 0.005 |
| 4 | " | 0.085 | 0.172 | 0.002 | 0.10 | 2.65 | 0.012 | 0.155 | 0.011 | 0.005 |
| 5 | Comparative | 0.066 | 0.169 | 0.009 | 0.37 | 3.98 | 0.008 | 0.084 | 0.021 | — |

TABLE 2

| | | Results of Measurements | | | | | | | | |
| --- | --- | --- | --- | --- | --- | --- | --- | --- | --- | --- |
| | | Surface roughness | Surface defects | | (Number of ups and downs due to intermetallic compounds/ 1 mm²) | | | Mechanical properties | | |
| | | | | | | | maximum | Tensile strength | Yield strength | Elongation |
| No. | | μRmax | 2.5μm | 3.75μm | 5μm | 10μm | length (μm) | (kg/mm²) | (kg/mm²) | (%) |
| 1 | Invention | 0.01 | 1.8 | 0 | 0 | 0 | 2.8 | 21.5 | 10.0 | 27.4 |
| 2 | " | 0.01 | 2.0 | 0 | 0 | 0 | 3.0 | 25.9 | 12.0 | 25.5 |
| 3 | " | 0.01 | 1.9 | 0 | 0 | 0 | 3.0 | 26.0 | 12.2 | 25.3 |
| 4 | " | 0.01 | 1.8 | 0 | 0 | 0 | 2.8 | 21.5 | 10.0 | 27.6 |
| 5 | Comparative | 0.12 | 40 | 28 | 14 | 2 | 12.5 | 26.7 | 12.8 | 24.9 |

As is evident from Tables 1 and 2, the Al-base alloy substrates (Nos. 1 to 4) are far superior in surface roughness and the size of surface defects to the comparative example prepared by the conventional method (No. 5). At present, in order to increase the capacity and density in data processing by computers, the surface defects of the substrate which are attributable to the intermetallic compound are required to be smaller than 3 μm in length. This requirement cannot be met by the substrate of the conventional method. In contrast, an Al-base alloy substrate in which the maximum surface defect is smaller than 3.0 m in length can be easily obtained by the method of the present invention. In addition, the method of the present invention forms very fine grains in the continuous casting stage, preventing micro-segrea final temperature of 300° C., and then cold-rolled to a thickness of 2 mm. The resulting strips were punched to the substrates, and heat treated under the same conditions as mentioned above.

The composition No. 10 was similarly continuously cast into a 12 mm thick strip, reduced to a thickness of 4 mm by cold-rolling, and, after annealing at 340° C. for 3 hours, cold-rolled to a thickness of 2 mm was punched to the substrates, followed by a heat treatment (250° C. for 2 hours) to get flatness.

The resulting samples were machined and finished by buffing in the same manner as in Example 1, and the size and number of intermetallic compounds, surface roughness and mechanical properties were measured. The results of the measurements are shown in Table 4.

TABLE 3

| No. | | Alloy Compositions (Wt %) | | | | | | | |
| --- | --- | --- | --- | --- | --- | --- | --- | --- | --- |
| | | Si | Fe | Cu | Mn | Mg | Cr | Zn | Ti |
| 6 | Invention | 0.07 | 0.13 | 0.003 | 0.08 | 2.78 | 0.19 | 0.008 | 0.014 |
| 7 | " | 0.08 | 0.15 | 0.006 | 0.35 | 3.85 | 0.08 | 0.008 | 0.020 |
| 8 | Comparative | 0.09 | 0.15 | 0.003 | 0.08 | 2.83 | 0.18 | 0.007 | 0.012 |
| 9 | " | 0.09 | 0.16 | 0.003 | 0.37 | 4.07 | 0.09 | 0.010 | 0.020 |
| 10 | Invention | 0.07 | 0.14 | 0.010 | 0.36 | 3.95 | 0.07 | 0.009 | 0.021 |

TABLE 4

| No. | | Surface roughness µRmax | Surface defects | | Results of Measurements (Number of ups and downs due to intermetallic compounds/ 1 mm²) | | Maximum length (µm) | Mechanical properties | | |
|---|---|---|---|---|---|---|---|---|---|---|
| | | | >2.5µm | >3.75µm | >5µm | >10µm | | Tensile strength (kg/mm²) | Yield strength (kg/mm²) | Elongation (%) |
| 6 | Invention | <0.01 | 2.0 | 0 | 0 | 0 | 2.9 | 21.7 | 10.1 | 27.5 |
| 7 | " | <0.01 | 2.4 | 0 | 0 | 0 | 3.0 | 26.0 | 11.9 | 25.0 |
| 8 | Comparative | <0.01 | 3.1 | 0 | 0 | 0 | 3.6 | 21.5 | 9.8 | 27.2 |
| 9 | " | <0.01 | 3.5 | 0 | 0 | 0 | 3.7 | 26.1 | 12.3 | 25.9 |
| 10 | Invention | <0.01 | 2.3 | 0 | 0 | 0 | 3.0 | 26.5 | 12.4 | 24.8 |

As is clear from Tables 3 and 4, the samples according to the present invention (Nos. 6, 7 and 10) all satisfy the requirement that the maximum surface defect should be smaller than 3.0 µm in length, irrespective of the rolling conditions subsequent to the continuous casting. However, in the comparative samples (Nos. 8 and 9) which have a cast thickness in excess of 15 mm, the intermetallic compound refining effect is insufficient since there exist defects of a length greater than 3 µm on the finished surface, which, accordingly, fail to meet the requirements for magnetic discs of higher density and capacity.

Having now fully described the invention, it will be apparent to one or ordinary skill in the art that many changes and modifications can be made thereto without departing from the spirit or scope of the invention as set forth herein.

What is claimed as new and desired to be secured by Letters Patent of the United States is:

1. A method for manufacturing magnetic memory discs, comprising:
   (a) continuously casting into a strip of a thickness of 4 to 15 mm a molten alloy composition containing alloy components consisting essentially of 2–6 wt% of Mg, less than 1 wt% of Mn, less than 0.3 wt% of Fe, less than 0.25 wt% of Zn and less than 0.35 wt% of Cr and at least one element selected from the group consisting of less than 0.08wt% of Ti and less than 0.01 wt% of B, the balance being aluminum and the inevitable impurities, the alloying components being present in sufficient numbers and amounts to give an alloy disc-substrate of sufficient strength by virtue of the intermetallic compounds which form in the alloy, and allowing said alloy to solidify at a rate rapid enough so that the size of the intermetallic compounds which precipitate does not exceed 3 microns;
   (b) rolling the resulting cast strip;
   (c) cutting the magnetic disc substrates from said strip, and;
   (d) coating the disc substrates with a magnetic layer to a reduced thickness made possible by the smooth surface characteristics of the underlying substrate.

2. The method of claim 1, wherein said titanium is present in said alloy in an amount effective to produce a fine grain structure and fewer micro-segregations in said strip.

3. The method of claim 2, wherein said titanium is present in said alloy in an amount of at least 0.001% by weight.

4. The method of claim 1, wherein said boron is present in said alloy in an amount effective to produce a fine grain structure and fewer micro-segregations in the strip.

5. The method of claim 1, wherein said boron is present in said alloy in an amount of at least 0.0005% by weight.

6. The method of claim 1, wherein said rolling step includes cold rolling with a 50% reduction ratio.

7. A magnetic recording disc prepared by the method of claim 1.

* * * * *

UNITED STATES PATENT AND TRADEMARK OFFICE
CERTIFICATE OF CORRECTION

PATENT NO. : 4,431,461

DATED : February 14, 1984

INVENTOR(S) : KOHZOH HOSHINO ET AL

It is certified that error appears in the above-identified patent and that said Letters Patent is hereby corrected as shown below:

Column 1, line 42, delete "high" and insert therefor --higher--.

Column 2, line 2, delete "which" and insert therefor --width--.

Column 2, line 15, delete ":," and insert therefor --"--.

Column 2, line 56, delete "are" and insert therefor --as--.

Column 3, line 33, delete "unabidably" and insert therefor --unavoidably--.

Column 4, line 29, delete "strature" and insert therefor --structure--.

Column 4, line 30, delete "regregations" and insert therefor --segregations--.

UNITED STATES PATENT AND TRADEMARK OFFICE
CERTIFICATE OF CORRECTION

PATENT NO. : 4,431,461

DATED : February 14, 1984

INVENTOR(S) : KOHZOH HOSHINO ET AL

It is certified that error appears in the above-identified patent and that said Letters Patent is hereby corrected as shown below:

Column 5, Table 2, delete "Surface defects" and "(Number of ups and downs due to intermetallic compounds/1 $mm^2$)" as shown and insert --Surface defects-- as the heading over Columns 4-8 with --(Number of ups and downs due to intermetallic compounds/1 $mm^2$)-- as a parenthetical expression beneath the "Surface defects" heading. (Corrected Table Shown Below)

TABLE 2

| | | Results of Measurements | | | | | | | |
|---|---|---|---|---|---|---|---|---|---|
| | | Surface roughness $\mu$Rmax | Surface defects (Number of ups and downs due to intermetallic compounds/1 $mm^2$) | | | | | Mechanical defects | |
| No. | | | 2.5$\mu$m | 3.75$\mu$m | 5$\mu$m | 10$\mu$m | maximum length ($\mu$m) | Tensile strength (kg/$mm^2$) | Yield strength (kg/$mm^2$) | Elongation (%) |
| 1 | Invention | 0.01 | 1.8 | 0 | 0 | 0 | 2.8 | 21.5 | 10.0 | 27.4 |
| 2 | " | 0.01 | 2.0 | 0 | 0 | 0 | 3.0 | 25.9 | 12.0 | 25.5 |
| 3 | " | 0.01 | 1.9 | 0 | 0 | 0 | 3.0 | 26.0 | 12.2 | 25.3 |
| 4 | " | 0.01 | 1.8 | 0 | 0 | 0 | 2.8 | 21.5 | 10.0 | 27.6 |
| 5 | Comparative | 0.12 | 40 | 28 | 14 | 2 | 12.5 | 26.7 | 12.8 | 24.9 |

UNITED STATES PATENT AND TRADEMARK OFFICE
CERTIFICATE OF CORRECTION

PATENT NO. : 4,431,461

DATED : February 14, 1984

INVENTOR(S) : KOHZOH HOSHINO ET AL

It is certified that error appears in the above-identified patent and that said Letters Patent is hereby corrected as shown below:

Column 5, line 56, delete "3.0 m" and insert --3.0 $\mu$m--.

column 7, line 28, delete "or" and insert therefor --of--.

Signed and Sealed this

Thirteenth Day of November 1984

[SEAL]

Attest:

GERALD J. MOSSINGHOFF

Attesting Officer

Commissioner of Patents and Trademarks